United States Patent [19]

Rainey

[11] 4,208,878

[45] Jun. 24, 1980

[54] OCEAN TIDE ENERGY CONVERTER

[76] Inventor: Don E. Rainey, 4529 NE. 21st Ave., Fort Lauderdale, Fla. 33308

[21] Appl. No.: 813,325

[22] Filed: Jul. 6, 1977

[51] Int. Cl.² ............................................. F03B 13/12
[52] U.S. Cl. ........................................ 60/496; 60/398; 290/53; 417/333
[58] Field of Search ........................... 60/398, 495–498, 60/501, 504, 506, 503; 417/330, 331, 333; 290/53, 42

[56] References Cited

U.S. PATENT DOCUMENTS

| | | | |
|---|---|---|---|
| 925,581 | 6/1909 | Kendall | 60/496 |
| 1,195,386 | 8/1916 | Mould | 60/503 |
| 1,364,619 | 1/1921 | Dolliver | 60/496 |
| 1,502,901 | 7/1924 | Bristow | 60/503 |
| 1,665,140 | 4/1928 | Master | 417/331 |
| 2,470,312 | 5/1949 | Levin | 60/496 |
| 3,515,889 | 6/1970 | Kammerer | 290/53 |
| 3,668,412 | 6/1972 | Vrana et al. | 290/53 |

*Primary Examiner*—Allen M. Ostrager
*Assistant Examiner*—Stephen F. Husar
*Attorney, Agent, or Firm*—Bacon & Thomas

[57] ABSTRACT

A tide motor energy source includes a tidal piston with a valved chamber. The piston drives a hydraulic ram to generate electrical power through a pressure accumulator and hydraulic motor. The ram can be locked hydraulically to enable the tidal piston to be held fixed at a desired elevation and the valves in the chamber permit it to be filled with water or air. The piston with its chamber filled with air at its low tide position and then released for controlled ascent while submerged acts as a submerged float for driving the ram upwardly while the tide runs in during one phase of its operation. The piston with its chamber filled with water while locked at its highest position as the tide begins to run out, and then released to fall under control, acts as a weight suspended in air after the water level drops below the piston for driving the ram downwardly during the second phase of its operation. The rising and falling motion of the tidal piston is used as the energy source.

2 Claims, 4 Drawing Figures

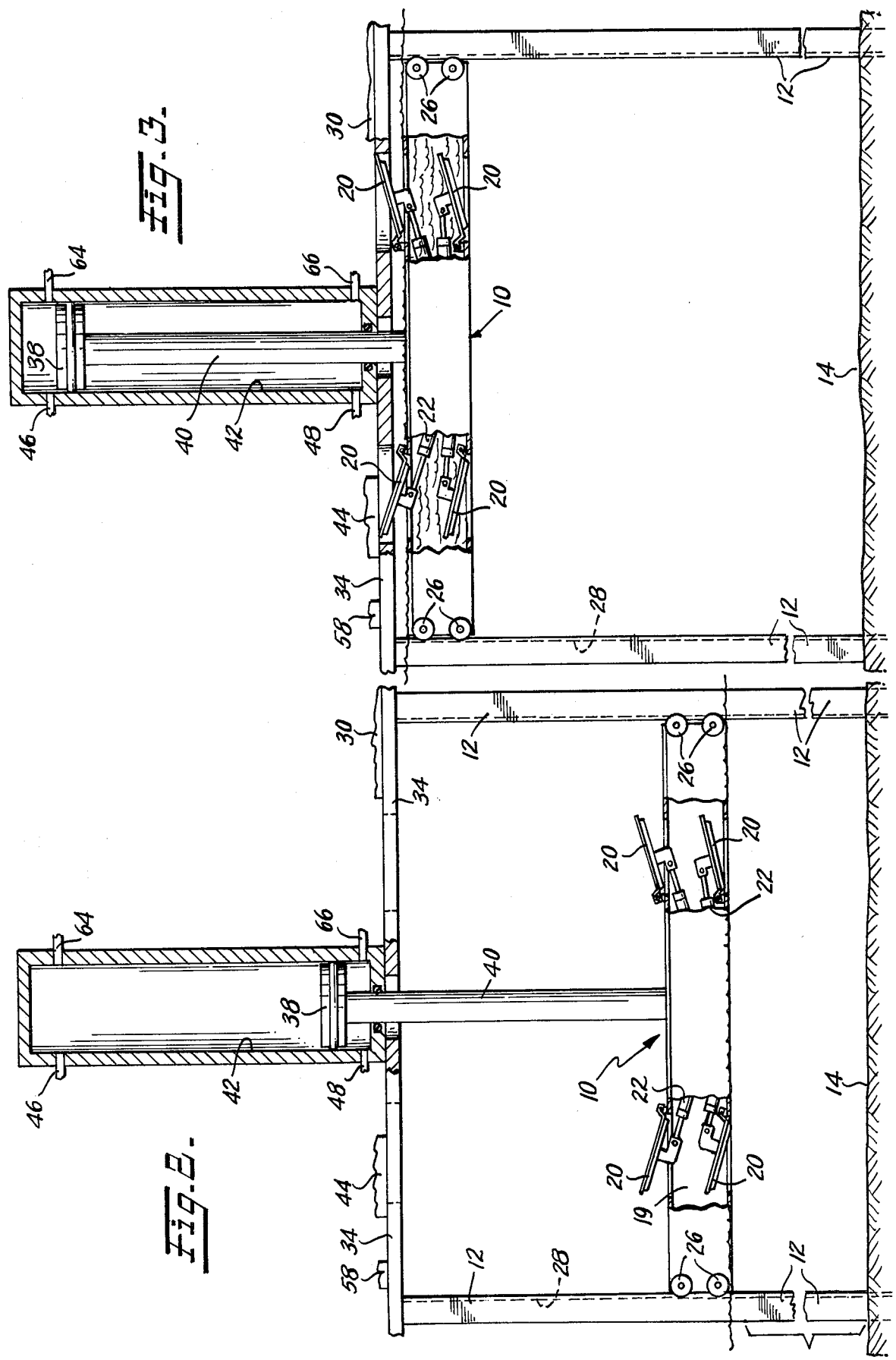

OCEAN TIDE ENERGY CONVERTER

FIELD OF THE INVENTION

This invention is in the field of tide motors for generating electrical energy.

BACKGROUND OF THE INVENTION

Tidal motors making use of the natural rise and fall of ocean tides are generally known to be useful for powering energy generating devices or for directly performing other useful work. Such prior art systems are known to use floats that rise and fall with the tides and to utilize the motion of the float as input energy to a motor of some kind that may drive an electrical dynamo. The motor itself may be hydraulic, pneumatic, or mechanical in nature, and often some form of energy storage system is provided to insure constant flow of power between the tidal changes.

While it is generally recognized that a large hollow float can be used to generate an appreciable upward buoyant force equivalent to the mass of the water displaced by the float less the weight of the float assembly, and that such force can be put to useful work, the prior art has failed to deal effectively with the fact that this force no longer exists during an outgoing tide, since the float element then can only generate a maximum force equivalent to its empty weight.

Prior art systems have attempted to work around this problem by using various pump arrangements for cyclically filling the float with water to sink it, then discharging the water from the float so that it is buoyant again. Obviously this represents a substantial consumption of the energy that is being derived from the tidal motor in the first place and is inefficient.

SUMMARY OF THE INVENTION

This invention uses an enclosed chamber called a tidal piston with floor valves to drive a hydraulic ram that is capable of generating intense hydraulic pressure which is then used to drive a hydraulic motor/electrical generator system. The hydraulic ram can be hydraulically locked to prevent movement of the piston, which travels in a vertical direction, at any elevation and in either direction. Through carefully programmed actuation of the hydraulic lock control on the ram, the piston chamber during one phase of its operation can be filled with air, sealed, and held at its lower position until it is more than completely submerged during the next incoming tide and then released to rise upwardly while remaining always submerged. During its other phase of operation it can be suspended at its higher position at high tide, gravitationally filled with water and, after the water level has dropped beneath the float, released to drop while remaining above the water surface. Thus, when the tidal piston is full of air and controllably released after it is submerged in water, it functions as a submerged float to drive the piston of the hydraulic ram upwardly due to its buoyancy. After the piston is filled with water at its higher position, and controllably released, after the piston is surrounded by air, it functions as a large weight mass to drive the ram piston downwardly until the tidal piston reaches its lower most position again. At its lower position, the piston is gravitationally drained, filled with air again and the cycle is repeated.

The various valves in the tidal piston and the valves associated with the ram are controlled through a suitably programmed central control unit so that the schedule of tides is taken into account on a daily basis. The cyclic filling and emptying of the piston chamber occurs by natural gravitational forces and no external energy is consumed. The useful work available on both upward and downward strokes of the piston and ram is limited practically only by the physical size of the piston chamber and the strength of the associated piston structure. The downward stroke of the piston uses the potential energy of the weight of the piston chamber filled with water and suspended in air, which can be a substantial amount if a large displacement chamber is utilized. The upward stroke of the piston utilizes the maximum buoyant force that can be generated by the piston chamber when it is filled with air because it is maintained submerged at all times during its upward stroke by careful control of the ram valves and proper design of the ram hydraulic system, the latter in accordance with accepted principles of hydraulic technology.

All of the foregoing will be made evident by the ensuing detailed description of a preferred embodiment of the invention.

DESCRIPTION OF THE DRAWINGS

With reference to the drawings appended to this application:

FIG. 2 schematically shows the tidal piston of FIG. 1 at its bottom of stroke and open position;

FIG. 3 is similar to FIG. 2 but shows the tidal piston at its top of stroke and flooding position.

DETAILED DESCRIPTION

Figure 1:
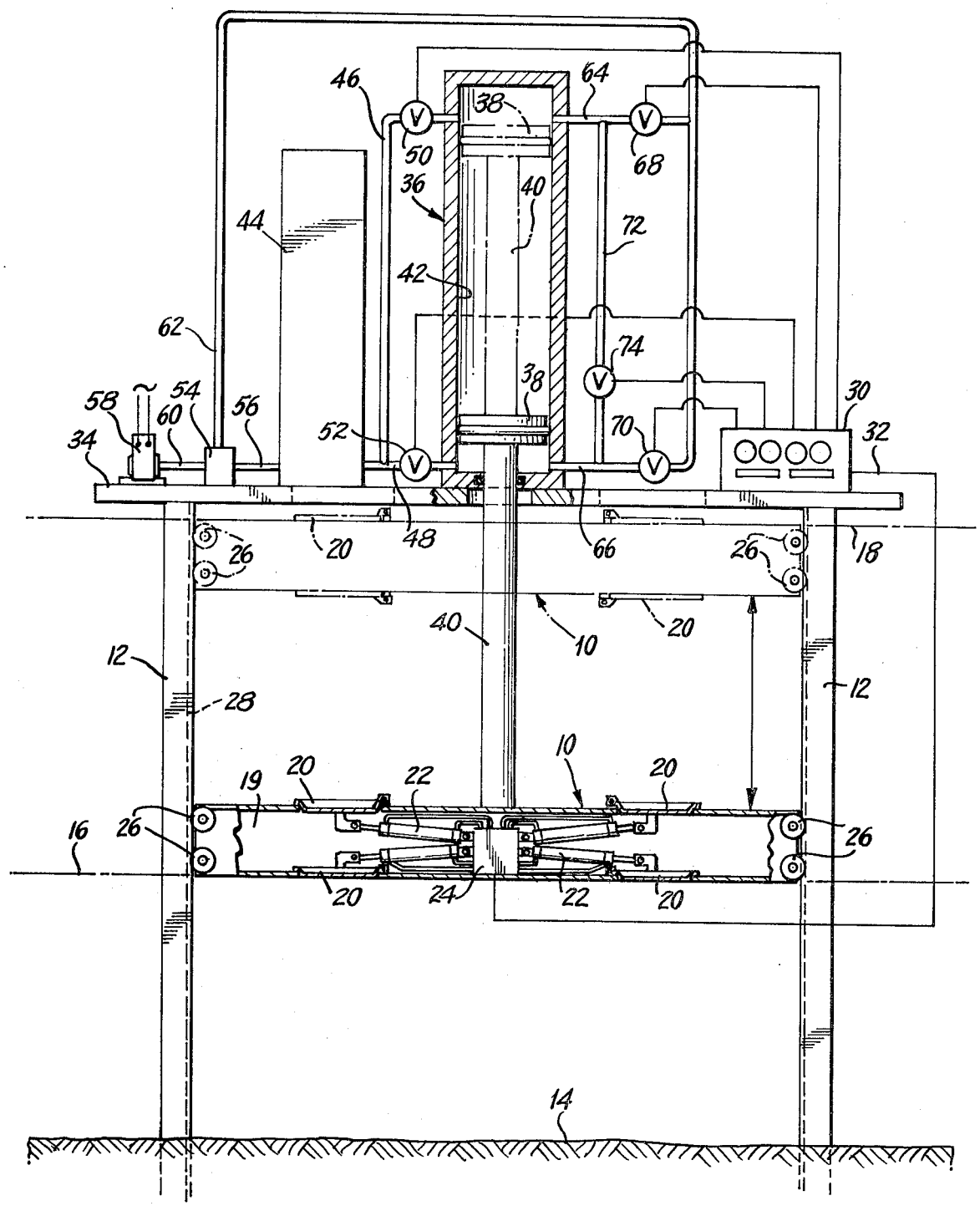
FIG. 1 is a schematic elevation view of an embodiment of the invention showing the tidal piston at a bottom of stroke and sealed position.

With reference to FIG. 1, a tidal piston 10 of any suitable cross sectional configuration is supported for vertical reciprocation by pilings 12 driven into or otherwise supported by the ground 14 beneath a body of tidal water. The normal low tide is indicated by the line 16 and the normal high tide by the line 18.

The tidal piston is provided with a chamber 19 and one or more valves 20 that can be rapidly opened or closed by actuating means 22 under the control of a suitable control unit 24 of conventional design to provide communication between the chamber 19 and the ambient environment (water or air). The actuating means 22 may be hydraulic, electrical, pneumatic or other suitable configuration. As illustrated, the valves 20 can be rapidly opened by actuators 22 to either allow water to flood the chamber 19 of the piston 10 or to discharge water already contained therein. When water is drained from the chamber 19, the water is replaced by air, and the air is completely expelled when the chamber is flooded.

The tidal piston 10 rides vertically on the pilings 12 by means of guide wheels 26 that ride in track 28 provided in or upon the pilings 12.

The flood valve control 24 is connected to a remote master control unit 30 via lead 32 for purposes that will become evident in the course of the description that follows.

A platform 34 is supported upon the pilings 12 above the surface of the body of water in which the piston 10 is disposed. A hydraulic ram 36 is supported on the platform and includes a ram piston 38 connected to the tidal piston 10 through piston rod 40. The ram piston 38 moves within the ram cylinder 42, with suitable sealing surfaces provided between relatively moveable elements of the ram and connecting rod.

The hydraulic ram 36 is normally full of suitable hydraulic fluid on both sides of the ram piston 38, and in communication with a suitable sump or hydraulic fluid supply. The opposite ends of the ram cylinder are connected to a pressure accumulator 44 through lines 46 and 48 that are provided with valves 50 and 52, respectively.

A hydraulic motor 54 is connected to the accumulator 44 via fluid line 56, and the motor 54 in turn is connected to an electrical generator or alternator 58 by means of shaft 60. A return fluid line 62 returns low pressure hydraulic fluid to ram 36 through lines 64, 66 that are provided with valves 68, 70.

A bypass line 72 interconnects the opposite ends of the ram cylinder 42 and is provided with a valve 74 for controlling flow therethrough.

As illustrated, all of the valve units 50, 52, 68, 70, and 74 are connected via electrical lines to the master control unit 30 for remote control purposes. However, the valves could be automatic pressure responsive valves of various suitable configurations, or controllable in any appropriate manner to achieve their intended function (e.g. pneumatic, hydraulic and manual).

The pressure accumulator 44 is designed to receive pressurized fluid from ram 36 during operation of the system and to store the fluid in pressurized condition for utilization by the hydraulic motor 54 during times when the ram 36 is not itself generating hydraulic pressure. The accumulator 44 may, for example, utilize a piston above which air is compressed while pressurized hydraulic fluid is supplied beneath the piston so that the hydraulic fluid continues to be pressurized within the accumulator 44 by the compressed air after the ram 36 has ceased generating hydraulic pressure. Alternate systems may utilize weights, springs or any other system known in the art for accumulating pressurized fluid and maintaining same in a pressurized condition for utilization by a hydraulic motor.

The operation of the system will now be described. As shown in FIG. 2, with the body of water at its low tide level 16, appropriate flood valves 20 are open and all fluid contained within the piston 10 is substantially drained. The flood valves are then closed and the piston becomes in effect an air filled chamber as shown in FIG. 1. The hydraulic system valves 50, 52, 68, 70 and 74 are all placed in the closed position by control unit 30 or otherwise held closed. The hydraulic ram 36 is then in a hydraulically locked condition. That is, incompressible hydraulic fluid is trapped on either side of the ram piston 38 and its movement in either direction is blocked.

The tidal piston 10, locked in its lower position as illustrated, is held in this position while the tide 16 rises to a suitable level somewhat above the surface of the piston 10. The full buoyancy force of piston 10 is therefore developed and corresponds to the weight of the water displaced by the piston less the weight of the piston structure itself.

The control unit 30 then is programmed to send a signal to valves 50 and 70 causing them to open. These valves 50 and 70 could also be pressure responsive so that they automatically open upon the build-up of a predetermined pressure upstream of the valve. The tidal piston 10 and the connected ram piston 38 then begin to move upwardly due to the force resulting from the buoyancy of the piston 10. Hydraulic pressure is generated above the ram piston 38 and is then discharged through line 46 into the accumulator 44 and to hydraulic motor 54 to drive electrical generator 58. Exhaust hydraulic fluid from the motor 54 returns to the ram cylinder 42 beneath ram piston 38 via lines 62 and 66. In the event that over pressurization of line 46 occurs, the valve 74 in the bypass line 72 may be opened fully or partially under the control of control unit 30, automatically, or even manually. If desired, suitable pressure sensing means could be provided in the high pressure circuit for enabling control unit 30 to automatically monitor the pressure level within various parts of the hydraulic system and suitable pressure regulators, motor speed controls and electrical power controls can be provided as required.

The tidal piston continues to move upwardly while the tide rises and while completely submerged until it reaches the approximate position shown in phantom lines. This represents the higher position of the piston 10. At the high position of the piston 10 the hydraulic system valves 50, 52, 68, 70 and 74 are once again all closed in a suitable manner, while hydraulic pressure to motor 54 continues to flow from accumulator 54, with the hydraulic fluid returning to a suitable supply source or sump (not illustrated).

While the piston 10 is at its higher position as shown in FIG. 3, submerged in water and locked in place, control unit 30 signals appropriate flood valves 20 to open to cause the chamber 19 to be flooded with water and the air expelled. The valves 20 are then closed to seal the chamber as the water level begins to drop as the tide runs out, as seen in FIG. 4.

Figure 4:
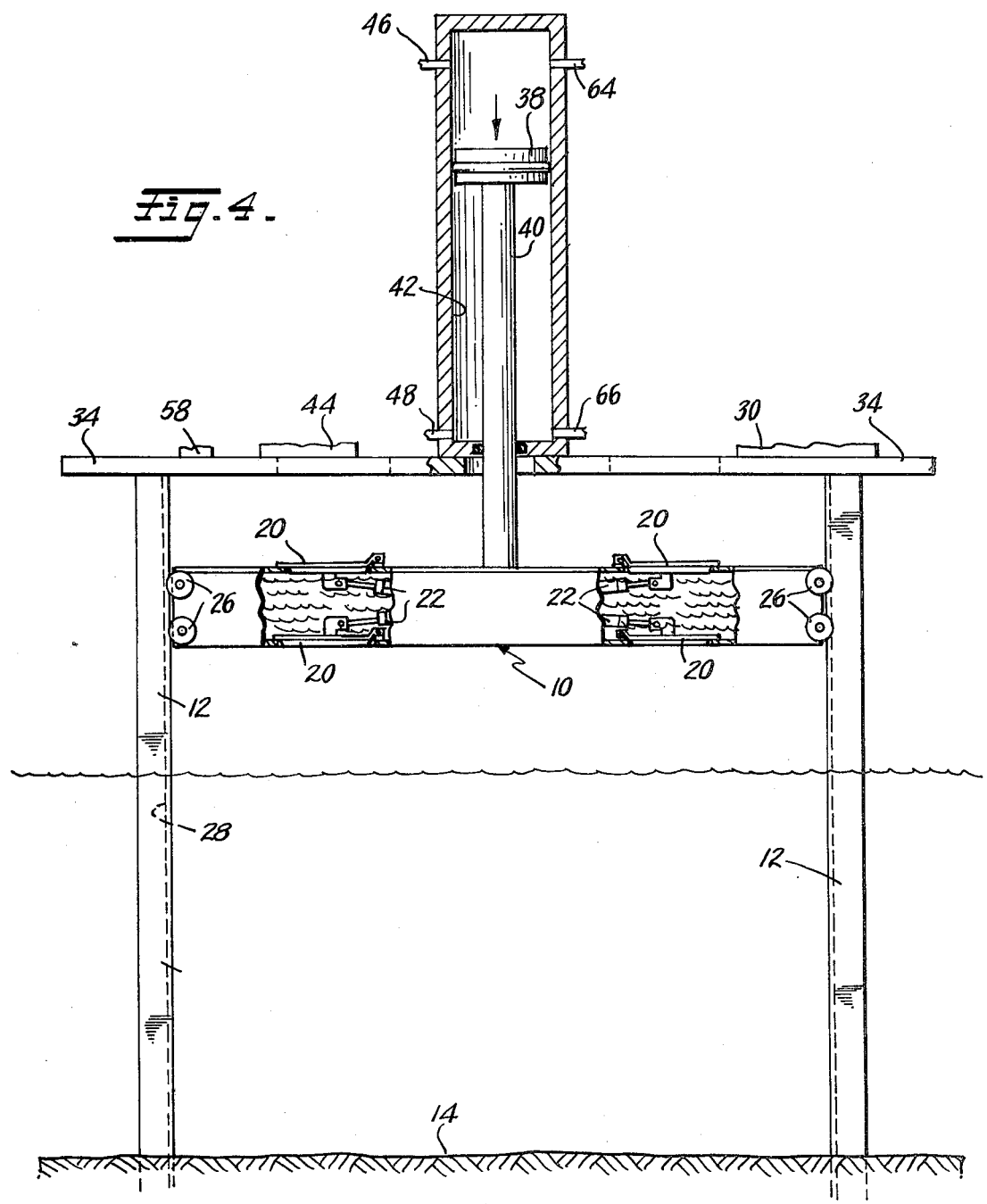
FIG. 4 is similar to FIG. 2 but shows the tidal piston during its dropping power stroke.

When the water level has dropped below tidal piston 10 as shown in FIG. 4, and while the interior of the piston 10 remains filled with water, the ram piston 38 experiences a downward pull equivalent to the weight of the empty tidal piston assembly combined with the weight of water within the chamber 19, all in air. When the surface of the water has dropped a suitable distance below the tidal piston 10, hydraulic valves 52 and 68 are opened and hydraulic pressure generated beneath ram piston 38 flows into accumulator 44 and to hydraulic motor 54. Makeup fluid to replace fluid previously discharged from accumulator 44 while ram piston 38 was not moving is drawn from a suitable supply or sump (not illustrated), and the tidal piston 10 slowly drops while suspended in air above the surface of the water. The piston 38 continues to generate hydraulic pressure until the tidal piston once again reaches its lower position. The volume of hydraulic fluid flow from ram 36 is sufficient, of course, to recharge the accumulator 44 while driving the motor 54 so that no interruption need be experienced in the flow of pressurized hydraulic fluid to motor 54. At the lower position of tidal piston 10, suitable valves 20 are once again opened (FIG. 2) to rapidly drain water from the chamber 19, the chamber is filled with air, the piston is temporarily locked at its lower position until it is submerged in water when the tide runs in, and the cycle is repeated.

It is contemplated that the tidal piston 10 be constructed to displace a large volume of water and to accommodate a large mass of water within its interior. Substantial forces are thereby made available to the hydraulic ram piston 38 for generating intense hydraulic pressures to drive hydraulic motor 54 and electrical power generator 58.

The simplest preferred embodiment has been described and illustrated in the present specification and drawings. In practice, it is contemplated that more than one hydraulic ram and connecting rod can be utilized with a single large tidal piston, and a plurality of accumulators, hydraulic motors and electrical generators can be used with the ram. It is also contemplated that the remote control unit 30 can be programmed in any number of ways to take into account the daily schedule of tides and the power requirements of the electrical generator. It is also contemplated that multiple tidal pistons could be used and their motion regulated through programmed valve actuation to provide a steady source of energy over a complete tide cycle. While a ram type pump, hydraulic motor and electrical generator have been shown and described as the means for using the vertical movement of the tidal piston as an energy source, it should be understood that any practical means could be utilized to extract energy from the motion of the tidal piston. Similarly, an hydraulically locking arrangement on the ram piston represents what is presently believed to be an extremely practical way of locking the piston against motion at its low and high tide elevations, but other locking arrangements coming within the scope of the claims appended hereto could be utilized to achieve the objectives of the invention. The ram and its associate hydraulics and controls, and the motor/generator system, are disclosed here as comprising a means for controlling the rate of ascent and descent of the tidal piston so that it remains submerged on the upward stroke and above the water surface on the downward stroke. However, various other alternations to the specific embodiment of this and other parts of the invention are possible and it is not intended to limit the scope of the present invention beyond what is set forth in the claims recited below.

What is claimed is:

1. A tidal motor comprising:
   (a) a vertically moveable buoyant member in the form of a piston including an enclosed chamber;
   (b) valve means providing selective communication between the chamber interior and its exterior;
   (c) control means for said valve means;
   (d) a positive displacement hydraulic pump and hydraulic fluid in circuit with the pump, the pump having a moveable element connected to the piston and arranged to utilize both upward and downward motion of said piston to drive the moveable element of the pump to pressurize said hydraulic fluid;
   (e) means for utilizing the pressurized hydraulic fluid to drain an electrical power generator;
   (f) an hydraulic lock system capable of trapping said hydraulic fluid on opposite sides of said pump moveable element to selectively prevent vertical motion of the piston, said lock system being in circuit with said hydraulic fluid.

2. A method of utilizing the period changing level of a surface of water as a source of energy comprising:
   (a) submerging a body in water having a cyclically rising and falling surface level in a manner limiting the body to move vertically, the body having a chamber associated therewith capable of being filled with and retaining air to provide positive buoyancy for the body, and valve means to selectively enable flooding of the chamber with water and to retain the water therein;
   (b) locking the body while it is filled with air and positively buoyant in its lower position until it is totally submerged while the water surface level is rising;
   (c) unlocking the body and utilizing the positive buoyancy of the body submerged in water as an energy source during a period while the water level is rising above the body;
   (d) flooding the chamber with water and locking the body at an elevated position when the water has reached its maximum level and until it has dropped below the body a predetermined distance;
   (e) unlocking the body and allowing it to fall in air at a controlled rate of descent, while utilizing the controlled falling weight of the filled body in air as an energy source during the period while the water level is dropping;
   (f) wherein utilization of the vertical rising and falling motion of the body as an energy source is carried out by using a positive displacement hydraulic pump connected directly to the body and using the hydraulic fluid delivered by said pump as an energy source, and wherein the locking of the body is carried out by hydraulically trapping said fluid in the pump to prevent motion of its moveable part.

* * * * *